United States Patent
Saeed et al.

(10) Patent No.: US 7,975,030 B2
(45) Date of Patent: Jul. 5, 2011

(54) REMOTE CONFIGURATION OF DEVICES USING A SECURE CONNECTION

(75) Inventors: Arshad Saeed, San Jose, CA (US); Jonathan Gohstand, San Francisco, CA (US); Scott Fanning, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 921 days.

(21) Appl. No.: 11/431,278

(22) Filed: May 9, 2006

(65) Prior Publication Data

US 2007/0266121 A1 Nov. 15, 2007

(51) Int. Cl.
*G06F 15/177* (2006.01)
(52) U.S. Cl. ............................ 709/220; 709/227; 709/228
(58) Field of Classification Search .................. None
See application file for complete search history.

(56) References Cited

U.S. PATENT DOCUMENTS

| | | | | |
|---|---|---|---|---|
| 5,890,176 | A * | 3/1999 | Kish et al. | 715/205 |
| 6,012,100 | A * | 1/2000 | Frailong et al. | 709/250 |
| 6,282,172 | B1 * | 8/2001 | Robles et al. | 370/230 |
| 6,286,038 | B1 * | 9/2001 | Reichmeyer et al. | 709/220 |
| 6,308,061 | B1 * | 10/2001 | Criss et al. | 455/418 |
| 6,466,972 | B1 * | 10/2002 | Paul et al. | 709/222 |
| 6,546,492 | B1 * | 4/2003 | Walker et al. | 726/3 |
| 6,668,261 | B1 * | 12/2003 | Basso et al. | 1/1 |
| 7,051,325 | B2 * | 5/2006 | Choi et al. | 717/168 |
| 7,062,765 | B1 * | 6/2006 | Pitzel et al. | 717/177 |
| 7,120,679 | B2 * | 10/2006 | Remer | 709/220 |
| 7,383,326 | B1 * | 6/2008 | Himberger et al. | 709/220 |
| 7,478,427 | B2 * | 1/2009 | Mukherjee et al. | 709/228 |
| 7,730,159 | B1 * | 6/2010 | Meyer et al. | 709/217 |
| 2001/0052052 | A1 * | 12/2001 | Peng | 711/133 |
| 2002/0066093 | A1 * | 5/2002 | Yen et al. | 717/169 |
| 2002/0144250 | A1 * | 10/2002 | Yen | 717/168 |
| 2005/0086328 | A1 * | 4/2005 | Landram et al. | 709/220 |
| 2005/0102662 | A1 * | 5/2005 | Samsalovic et al. | 717/168 |
| 2006/0005016 | A1 * | 1/2006 | Lee et al. | 713/164 |
| 2006/0090080 | A1 * | 4/2006 | Pearson et al. | 713/187 |
| 2006/0174069 | A1 * | 8/2006 | Shaw et al. | 711/146 |
| 2006/0265386 | A1 * | 11/2006 | Richter | 707/10 |
| 2006/0271697 | A1 * | 11/2006 | Kruse et al. | 709/230 |
| 2007/0002768 | A1 * | 1/2007 | Nandy et al. | 370/255 |
| 2007/0250560 | A1 * | 10/2007 | Wein et al. | 709/201 |
| 2008/0002020 | A1 * | 1/2008 | Choi et al. | 348/14.02 |
| 2010/0161717 | A1 * | 6/2010 | Albrecht et al. | 709/203 |

OTHER PUBLICATIONS

Nortel Networks, Contivity Secure IP Services Gateways, Nortel Networks Portfolio Brief, Copyright 2003 Nortel Networks, www.nortelnetworks.com.

(Continued)

*Primary Examiner* — Ian N Moore
*Assistant Examiner* — Dung B Huynh
(74) *Attorney, Agent, or Firm* — Stolowitz Ford Cowger LLP (57) ABSTRACT

Methods and systems for configuring a remote device are described. In one embodiment, a method of configuring a remote device while negotiating a secure connection between the remote device and a central server is described. The method involves transmitting a configuration request from the remote device to the central server, including a request for a location to retrieve the latest configuration file from. The method also entails receiving a configuration response from the central server, with a pointer to such a location. The configuration file is retrieved from the indicated location, and applied to the remote device. The remote device sends general information about its configuration and status to the central server, using the secure connection.

14 Claims, 7 Drawing Sheets

OTHER PUBLICATIONS

Check Point Software Technologies LTD, The Smartest Choice for Unified Security Management, Jan. 29, 2009 from http://www.checkpoint.com/products/smartcenter/.

R. Pereira, S. Anand, B. Patel, The ISAKMP Configuration Method, Internet Engineering Task Force IP Security Working Group, Jan. 29, 2009 from http://www.tools.ietf.org/html/draft-ietf-ipsec-isakmp-mode-cfg-05.

R. Pereira, S. Beaulieu, Extended Authentication within ISAKMP/Oakley, Internet Engineering Task Force IP Secure Remote Access Working Group, Jan. 29, 2009 from http://www.potaroo.net/ietf/draft-ietf-ipsec-isakmp-xauth/.

Joel M. Snyder, VPN Remote Access Authentication: Enabling Remote Access Without Compromising Security, IPSecRemote Access Authentication, Mar. 23, 2001, pp. 1-11.

SmartCenter, The Smartest Choice for Unified Security Management; available at www.checkpoint.com/products/smartcenter; retrieved Jan. 29, 2009.

Pereira, R., et al., Extended Authentication within ISAKMP/Oakley (XAUTH); <draft-ietf-ipsec-isakmp-xauth-06.txt>; Dec. 1999.

Harkins, D., et al., The Internet Key Exchange (IKE); RFC 2409; Nov. 1998.

Pereira R., et al., The ISAKMP Configuration Method <draft-ietf-ipsec-isakmp-mode-cfg-05.txt>; Aug. 17, 1999.

Nortel Networks; Contivity Secure IP Services Gateways; Nortel Networks; 2003.

Snyder, Joel M., VPN Remote Access Authentication: Enabling Remote Access without Compromising Security; IPSec Remote Access Authentication; Mar. 23, 2001.

Cisco Easy VPN, Control Remote Offices and Teleworkers; Cisco Systems; available at www.cisco.com/en/US/products/sw/secursw/ps5299/index.html; retrieved Nov. 8, 2010.

Cisco Easy VPN (White Papers), Cisco Systems; available at http://www.cisco.com/en/US/products/sw/secursw/ps5299/products_white_paper09186a00800a4b36.shtml; retrieved Nov. 8, 2010.

Cisco Extends Security, Voice, and Wireless Services with Cisco IOS Software Release 12.4(4)T; Internet Technologies Division; Cisco Systems; Oct. 2005.

Bi-Directional Netscreen Remote VPN using xAuth and Firewall Authentication Service; Document No. FW-400-002; NetScreen; Version 1.1, Oct. 1, 2004.

Configuring Router to CPN Client, Mode-Config, Wild-Card Pre-Shared Key with NAT; Document ID 14123; Nov. 21, 2006.

Pereira, R., et al., The ISAKMP Configuration Method; <draft-ietf-ipsec-isakmp-mode-cfg-04.txt>; May 13, 1998.

Check Point Introduces VPN-1 Edge Appliance Family for Securing Remote Sites and Deploying Large Scale VPNs; Check Point Software Technologies; available at www.checkpoint.com/press/2003/vpn1edge100703.html, Oct. 7, 2003.

Beaulieu, S., Extended Authentication within IKE (XAUTH) <draft-beaulieu-ike-xauth-02.txt>; Oct. 2001.

Nortel VPN Router Configuration—Basic Features, Version 7.00; Nortel; Feb. 2007.

Internet Key Exchange Mode Configuration; Cisco IOS Release 12.0(4)XE and 12.0(7)T; Nov. 14, 2007; http://www.cisco.com/en/US/docs/ios/12_0/12_0x/feature/guide/modconf.html.

* cited by examiner

Flowchart 600

Figure 6

Flowchart 700

Figure 7

REMOTE CONFIGURATION OF DEVICES USING A SECURE CONNECTION

BACKGROUND

1. Field of the Invention

Embodiments of the present invention relate to configuration of remote devices using a secure protocol.

2. Related Art

When remote devices connect to a gateway, for example, when an IPSec VPN tunnel is established between a remote client and a corporate gateway, it is often necessary to apply some policy and configuration commands to the remote client. For example, the corporate gateway may require the remote client to authenticate users using an 802.1x authentication scheme; so long as the VPN tunnel is up, the 802.1x authentication scheme must be active for traffic through the tunnel.

In other situations, a remote device may connect back to a gateway for the first time, and need to be brought up to the current configuration. For example, a large corporation may issue its remote employees preconfigured hardware for establishing a VPN backed the corporate site, e.g., for telecommuting purposes. This preconfigured hardware, when it first connects to the corporate site, will need to be reconfigured to match the current state required by the corporate network.

Other, similar, circumstances exist, which require that multiple remote devices be reconfigured, either permanently or temporarily, in order to enable or facilitate connection with a remote server. Further, once these devices are connected, it is often useful, and sometimes necessary, that the remote server be able to monitor the status of all the connected devices. Status information can be as simple as a working/not-working flag, or the version of the configuration currently being executed. It can also be more complicated, e.g., performing a polling operation of all network computers attached to a central point to determine available/used RAM in order to decide whether an additional program can be installed on existing hardware.

At present, several approaches are used to try and to fill this need. First, each individual device can be manually configured, e.g., by logging into each device and uploading the necessary configuration commands. This is not a scalable solution, in that every additional device requires an additional investment of time to be configured.

Another approach is to use a specially configured computer, loaded with specialized software, which is provided with all of the necessary passwords and user names to log into and configure every device that connects to the remote server. While better than manual configuration, this approach still has several drawbacks. First, the specialized computer must establish a separate, secure connection to each device. Additionally, the necessary login parameters have to be provided to the remote server.

A third approach is to continually extend the protocol used for establishing a VPN tunnel, such that all of the configuration commands that are going to be performed on the remote device can be transmitted from the remote server to the remote device during negotiation of the tunnel. Several problems for this solution exist as well. One problem is that every new feature implemented on the remote device requires a corresponding alteration to the protocol, and upgrades to both the remote server and the remote device.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Portions of the detailed description that follows are presented and discussed in terms of a method. Although steps and sequencing thereof are disclosed in a figure herein (e.g., FIG. 8) describing the operations of this method, such steps and sequencing are exemplary. Embodiments of the present invention are well suited to performing various other steps or variations of the steps recited in the flowchart of the figure herein, and in a sequence other than that depicted and described herein.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "testing," "using," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Computer System

Figure 1:
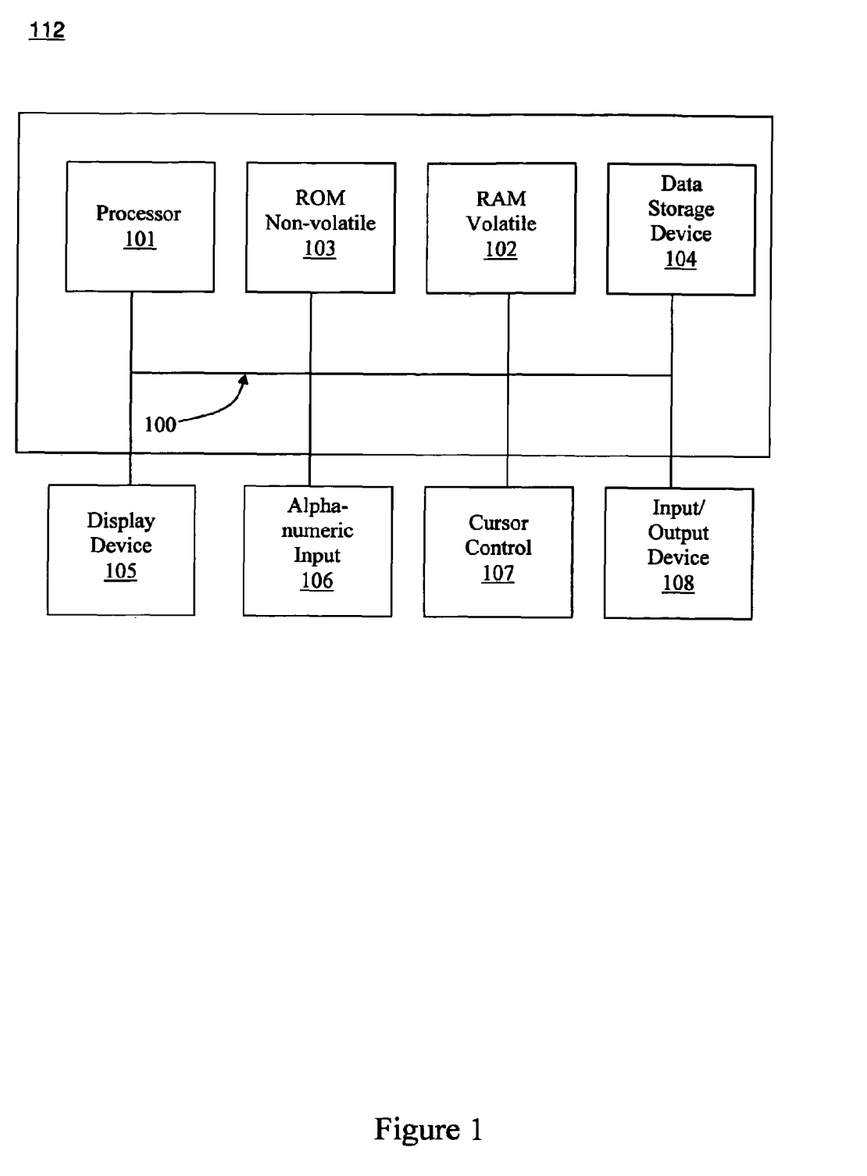
FIG. 1 is a block diagram of an exemplary computer system upon which embodiments of the present invention may be implemented.

Referring first to FIG. 1, a block diagram of an exemplary computer system 112 is shown. It is appreciated that computer system 112 described herein illustrates an exemplary configuration of an operational platform upon which embodiments of the present invention can be implemented. Nevertheless, other computer systems with differing configurations can also be used in place of computer system 112 within the scope of the present invention. That is, computer system 112 can include elements other than those described in conjunction with FIG. 1.

Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 may also contain an optional display device 105 coupled to bus 100 for displaying information to the computer user. Moreover, computer system 112 also includes a data storage device 104 (e.g., disk drive) for storing information and instructions.

Also included in computer system 112 is an optional alphanumeric input device 106. Device 106 can communicate information and command selections to central processor 101. Computer system 112 also includes an optional cursor control or directing device 107 coupled to bus 100 for communicating user input information and command selections to central processor 101. Computer system 112 also includes signal communication interface (input/output device) 108, which is also coupled to bus 100, and can be a serial port. Communication interface 108 may also include wireless communication mechanisms. Using communication interface 108, computer system 112 can be communicatively coupled to other computer systems over a communication network such as the Internet, intranet (e.g., a local area network), wireless network, or wireless mesh network.

Figure 2:
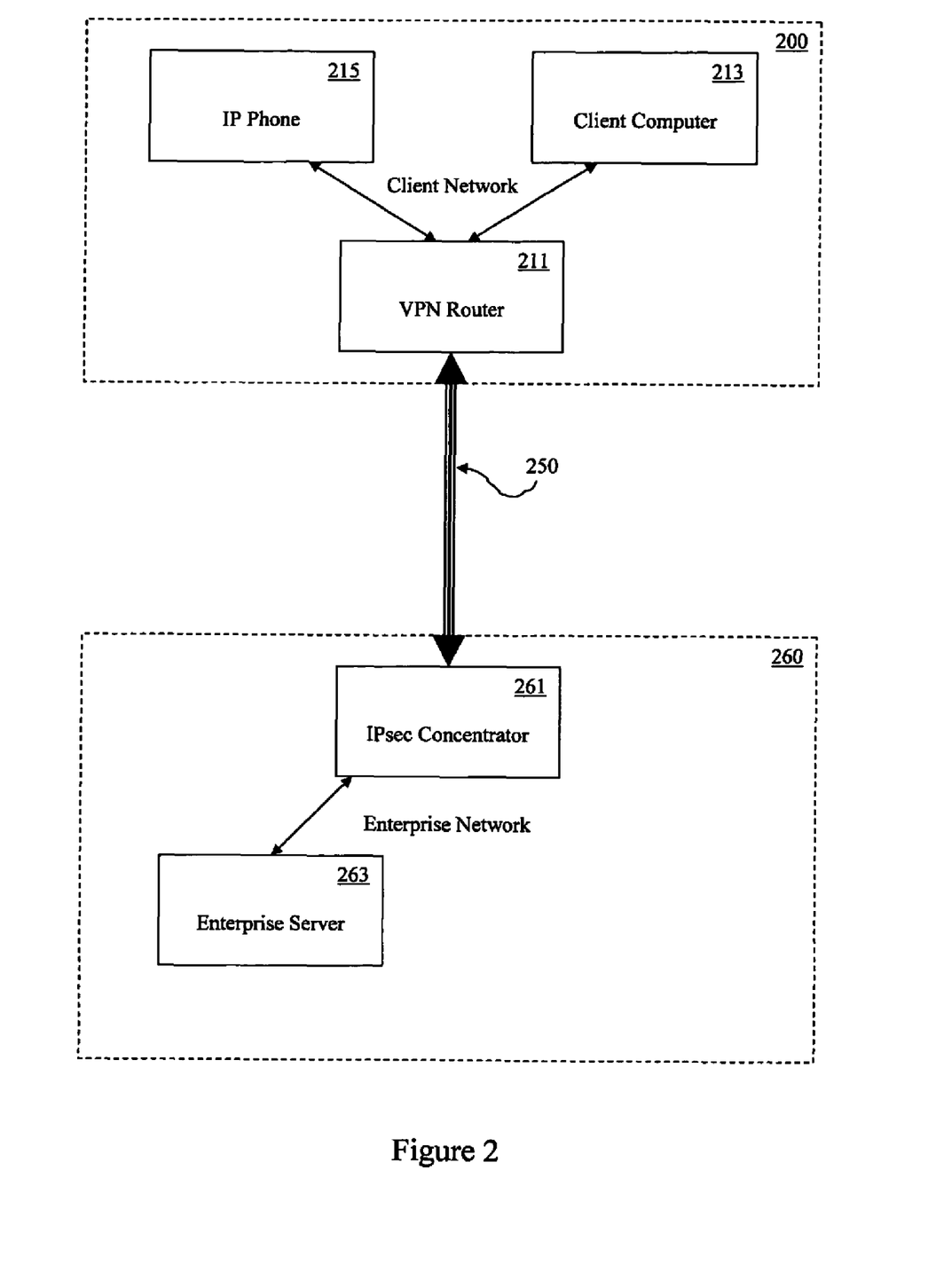
FIG. 2 is a block diagram of an exemplary configuration of a client network and a corporate network.

With reference now to FIG. 2, an exemplary configuration of a client network and a corporate network are depicted. Client network 210 is shown as connected to and communicating with enterprise network 260 via an IPSec tunnel 250, in a configuration commonly used to establish a virtual private network, or VPN. IPSec, short for IP security, is a set of protocols designed to support the secure exchange of packets at the IP layer. IPSec is commonly used in the implementation of a VPN, in a manner well understood in the art.

IPSec requires that the sending and receiving devices share an encryption key. In some implementations of client network 210 and enterprise network 260, the IKE, or Internet Key exchange, protocol is utilized to facilitate this exchange.

Client network 210, as shown in FIG. 2, includes a VPN router 211, client computer 213, and IP phone 215. Enterprise network 260, as shown in FIG. 2, includes IPSec concentrator 261 and enterprise server 263. In establishing a VPN connection between client network 210 and a enterprise network 260, VPN router 211 communicates with IPSec concentrator 261.

In the prior art, when a remote device, such as VPN router 211, connects to a corporate gateway, such as IPSec concentrator 261, some policy and configuration changes need to be applied to the remote device. One approach has been to utilize Mode-Config exchanges between Phase 1 (IKE) and Phase 2 negotiation. As was discussed previously, this approach involves defining separate attributes for every desired configuration command, and continually updating both VPN router 211 and IPSec concentrator 261 to support the extended Mode-Config command set.

Figure 3:
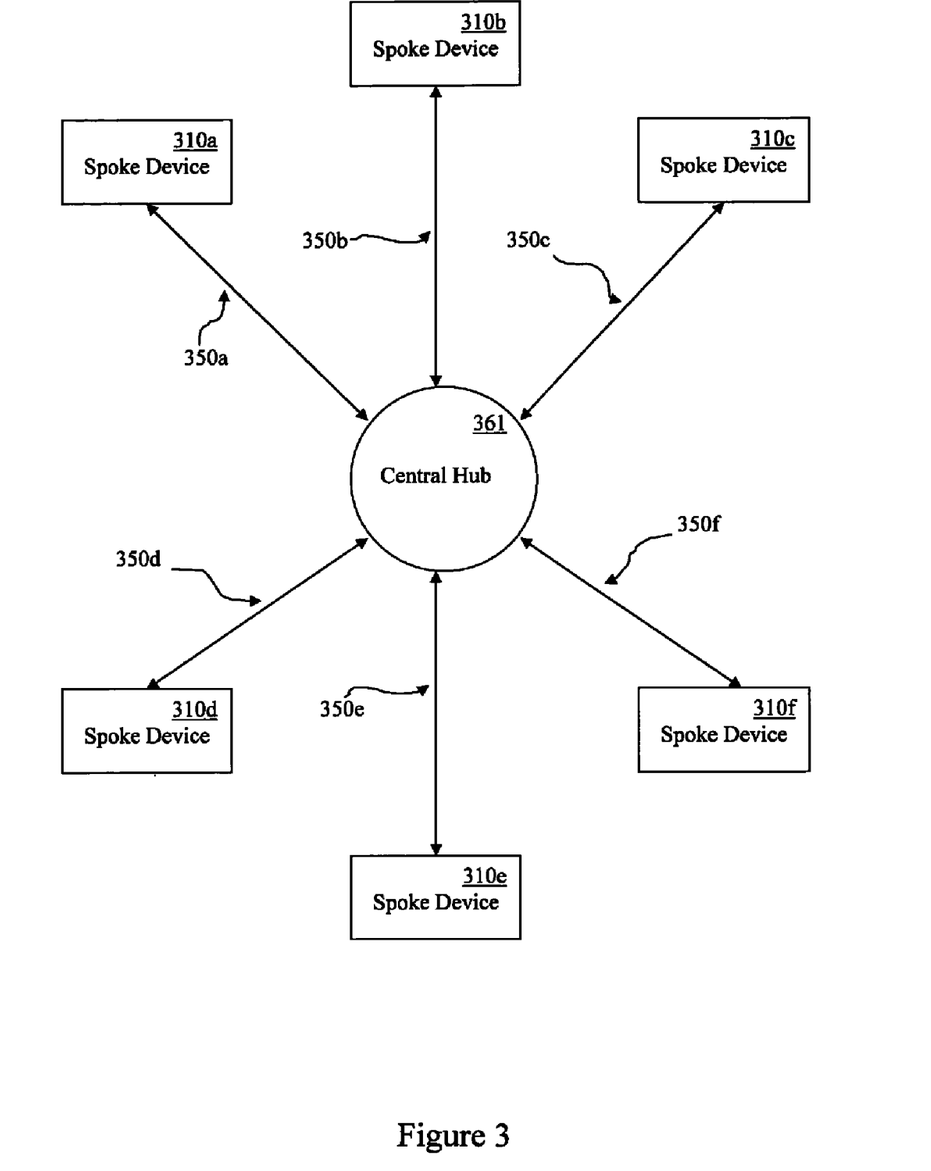
FIG. 3 is a block diagram of an exemplary hub-spoke network, upon which embodiments of the present invention may be implemented.

With reference now to FIG. 3, an exemplary hub-spoke network 300 is depicted. Hub-spoke network 300 represents a commonly utilized architecture for such networks. The hub of hub-spoke network 300 can be, for example, a large-scale enterprise network, such as enterprise network 260, and more specifically a gateway to the enterprise network, e.g., IPSec concentrator 261. Each spoke of the hub-spoke network 300 is a secure connection, e.g., an IPSec tunnel, connecting to a remote device. For example, each remote device 310a through 310f could be a gateway to a separate remote client network, such as client network 210, and more specifically a separate VPN router, e.g. VPN router 211.

New Management Mechanism for IPSec VPN Deployment

In some embodiments, the Mode-Config exchange between the remote device and the remote server is expanded to incorporate two new attributes: configuration-URL and configuration version. Between Phase 1 and Phase 2, e.g., Phase 1.5, the remote device requests these two attributes from the remote server. If the server supports these attributes, and if these attributes are available to send, they are included in the Mode-Config reply sent back to the remote device. In these embodiments, because these two attributes are not mandatory, backward compatibility is maintained.

The first attribute, configuration-URL, serves as a pointer, or an indicator, to a location accessible to the remote device where a configuration file resides. Such location could be an external web server, an internal web server, an FTP site, or any similar repository. In some embodiments, a secure connection to such a repository is preferred, which will influence the choice of protocols utilized to connect a remote device to a repository. The configuration file may contain the complete configuration needed by the remote device, or a set of additional configuration information to be added to the existing configuration of the remote device.

By putting configuration commands in such a file, the Mode-Config protocol does not need to be extended every time a new configuration command is to be run on the remote device. Instead, most remote configuration commands are placed in a configuration file, which can be retrieved by the remote device and applied to the remote device, without necessarily needing to alter the remote server.

The second attribute, configuration-version, serves as an identifier for the configuration file indicated by configuration-URL. In some embodiments, for example, the remote device can store the last applied configuration, and so if the configuration-version indicated that the central server is still available locally, the remote device does not need to retrieve it from an external source a second time. In some other embodiments, for example where the present invention is used to update the running configuration on the remote device, the remote device can check a configuration-version against the configuration as presently running on the remote device. If the remote device is already running the latest version of the configuration, there is no need to retrieve it a second time.

In some embodiments, remote devices are configured to apply a configuration indicated by configuration-URL only while connected to a remote server. When the connection between one such remote device and the remote server is terminated, this remote device can revert to the configuration it was running before it applied the configuration indicated by configuration-URL. In some embodiments, this is accomplished by backing up the configuration running on the remote device before applying a new configuration, e.g., by checkpointing the current configuration. In this manner, the transient configuration can be rolled back when necessary, e.g., when the tunnel between the remote device and the remote server comes down. In some of these embodiments, if the configuration-version should change while the tunnel between the remote device and the remote server remains, the remote device will roll back to this checkpointed configuration, retrieve the latest configuration, and then apply it.

Figure 4:
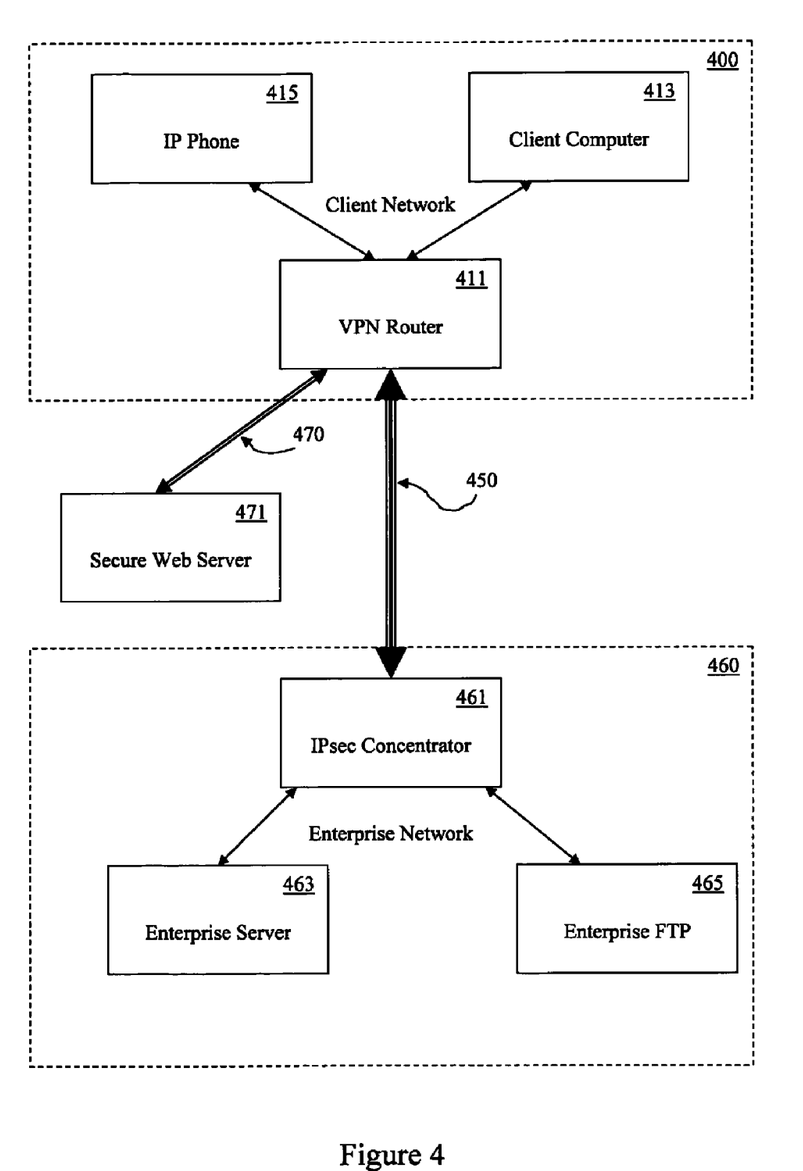
FIG. 4 is a block diagram of a configuration of a client network and a corporate network upon which embodiments of the present invention may be implemented.

With reference now to FIG. 4, a configuration of a client network and an enterprise network is depicted, in accordance with one embodiment of the present invention. Client network 410 is shown as connected to and communicating with enterprise network 460 via an IPSec tunnel 450, e.g., in a VPN configuration. Client network 410 includes a number of exemplary devices, including a VPN router 411, client computer 413, and IP phone 415. In some embodiment, client network 410 is also connected to secure web server 471 via connection 470, e.g., a secure internet protocol connection. Enterprise network 460 includes a number of exemplary devices, including IPSec concentrator 461, enterprise web server 463, and enterprise FTP server 465.

Figure 5:
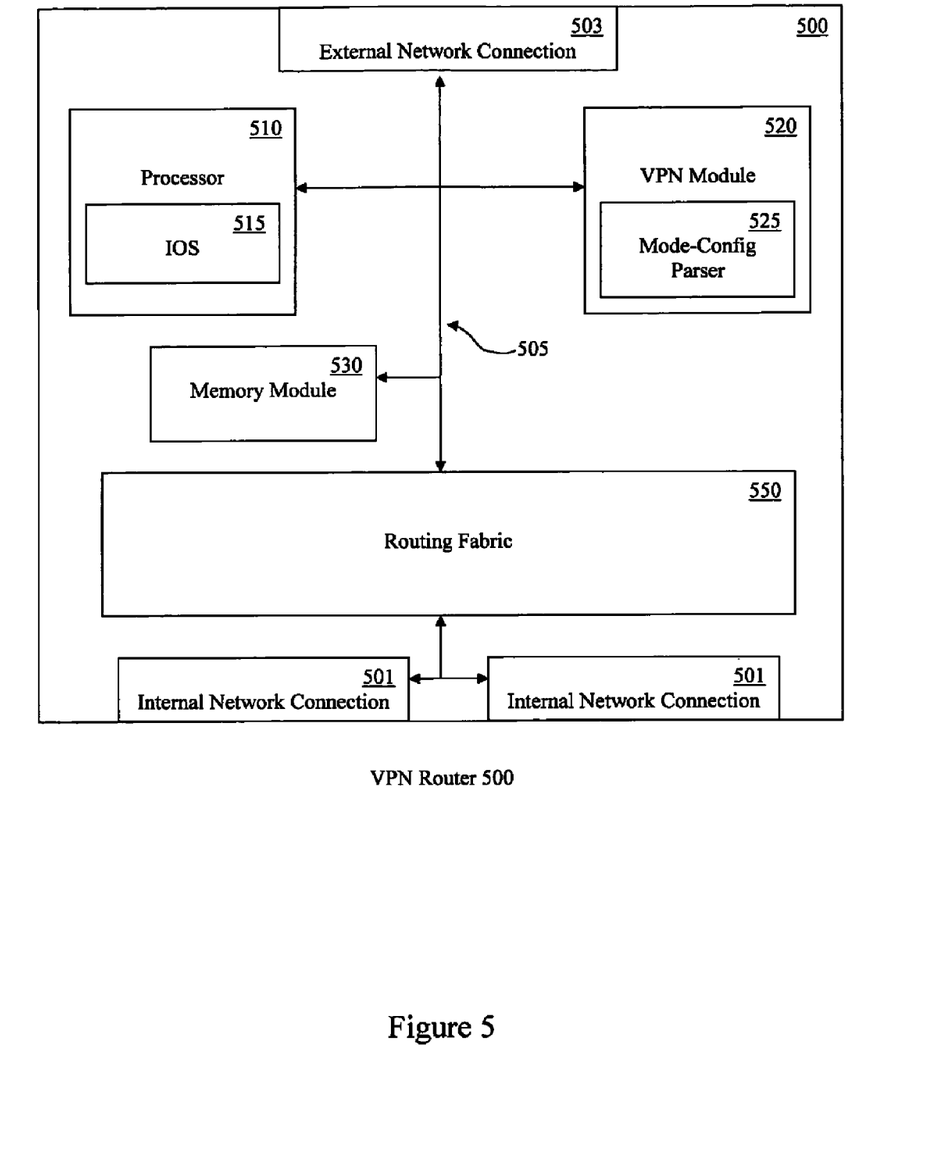
FIG. 5 is a block diagram of a Virtual Private Networking router, in accordance with one embodiment of the present invention.

With reference now to FIG. 5, a VPN router 500 is depicted, in accordance with one embodiment of present invention. While VPN router 500 is depicted as incorporating specific components, it is understood that alternative embodiment of the invention can be implemented on platforms including different configurations. For example, some of the tasks performed by a specific hardware module in accordance with the depicted embodiment of the invention, may be performed by an alternative device, either hardware or software or combination thereof. Further, it is understood that embodiments of the present invention extend to embodiments not depicted, such as a combination of separate and/or discrete hardware and software systems that perform the same or similar role as the depicted embodiments.

VPN router 500 is shown as incorporating a processor 510. Executing on processor 510 is IOS 515, the operating system for VPN router 500. VPN router 500 also incorporates a VPN module 520, which includes Mode-Config parser 525. VPN router 500 incorporates memory module 530, and routing fabric 550. These components are interconnected by bus 505. VPN router 500 has at least one external network connection 503, and may incorporate a plurality of the internal network connections 501.

Figure 6:
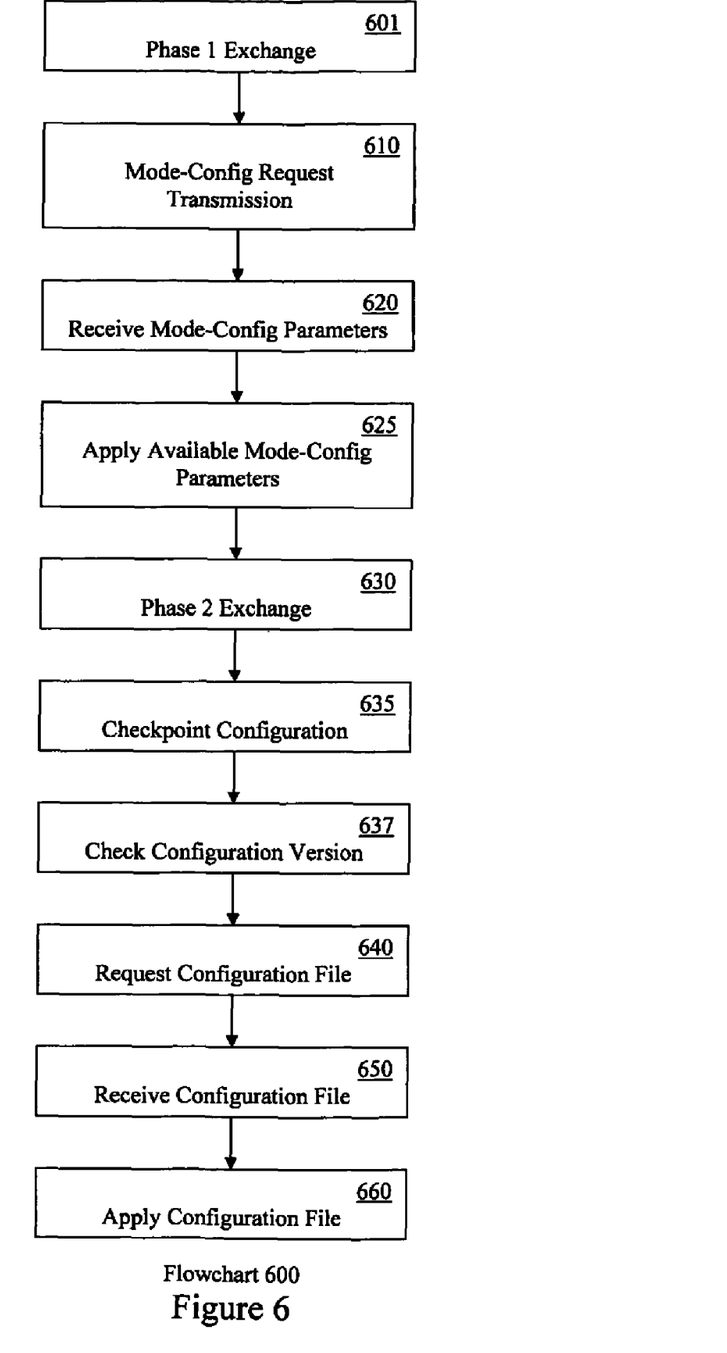
FIG. 6 is a flowchart of the interaction of a remote device with a central server, in accordance with one embodiment of the present invention.

With reference now to FIG. 6, a flowchart 600 describing the interaction of a remote device with a remote server is depicted, in accordance with one embodiment of the present invention. Although specific steps are disclosed in flowchart 600, such steps are exemplary. That is, embodiments of the present invention are well suited to performing various other (additional) steps or variations of the steps recited in flowchart 600. It is appreciated that the steps in flowchart 600 may be performed in an order different than presented, and that not all of the steps in flowchart 600 may be performed.

With reference now to step 601, a phase 1 IKE exchange is performed between the remote device and the remote server, e.g., two VPN gateways. For example, with reference to FIG. 4, VPN router 411 initiates a phase 1 IKE exchange with IPSec concentrator 461.

With reference now to step 610, the remote device sends a Mode-Config request to the remote server. In some embodiments, this request includes a discreet request for the configuration-URL and configuration-version attributes to be sent back. In some embodiments, this request occurs during phase 1.5, e.g., this request is an expanded version of the normal Mode-Config request. With reference to FIG. 4, VPN router 411 transmits a Mode-Config request that includes a request for configuration-URL and configuration-version attributes from IPSec concentrator 461.

With reference now to step 620, the central server responds by transmitting the appropriate Mode-Config attributes. In some embodiments, the remote server sends back a configuration—URL and configuration-version attributes. A remote server which does not recognize the request for the configuration-URL and configuration-version attributes will simply ignore this request, which allows for backwards compatibility with older systems. With reference to FIG. 4, IPSec concentrator 461 transmits the configuration-URL and configuration-version attributes to VPN router 411.

With reference now to step 625, the remote device applies any appropriate Mode-Config attributes received from the remote server. In some embodiments, not all configuration commands to be executed on the remote device can be incorporated into a remote configuration file; for such commands, the remote server can continue to transmit appropriate Mode-Config attributes, as is presently done in the art. For example, in some embodiments, attributes necessary to negotiate phase 2 SAs, such as IP_ADDRESS, NETMASK, SPLIT_INCLUDE, and similar attributes, are sent directly to the remote device, in order to facilitate the establishing of the IPSec tunnel. With reference now to FIG. 4, VPN router 411 applies any Mode-Config attributes transmitted from IPSec concentrator 461.

With reference now to step 630, the remote device and the remote server begin a phase 2 IKE exchange. With reference to FIG. 4, VPN router 411 and IPSec concentrator 461 begin a phase 2 exchange.

With reference now to step 635, in some embodiments the remote device checkpoints the current configuration. In some embodiments of the present invention, configuration commands received from the remote server are intended only to be applied for a limited time, e.g., for the duration of a secure connection between the remote device and the remote server. In such embodiments, it is desirable for the remote device to be able to resume its previous configuration. Therefore, in some such embodiments, the remote device checkpoints the current configuration before applying a temporary configuration specified by the central server. With reference to FIG. 4, VPN router 411 checkpoints the configuration currently operating on VPN router 411, before applying a new configuration specified by IPSec concentrator 461.

With reference to step 637, in some embodiments, the remote device compares the configuration-version attribute with configurations available locally on the remote device, e.g., currently executing on the remote device, or available to the remote device from an internal data storage. If the configuration-version indicated by the configuration-URL attribute is already available to, or executing on, the remote device, it is not necessary to retrieve a configuration file from the configuration-URL location. With reference to FIG. 4, VPN router 411 checks the configuration-version attribute received from IPSec concentrator 461 against configuration profiles stored locally, to determine whether it is necessary to retrieve the configuration file indicated.

With reference to step 640, the remote device starts to retrieve a configuration file from the location indicated by the configuration-URL attribute received from the remote server. In different embodiments, the location indicated by the configuration-URL attribute will vary. For example, the location could be accessible via an internal secure file server, or an internal FTP site, or from an alternative Internet location. In many embodiments, it is desirable to use a secure transfer mechanism, e.g., an encrypted connection to a secure web site, in order to reduce the likelihood of receiving false or compromised configuration files. With reference to FIG. 4, VPN router 411 could attempt to retrieve a configuration file from secure web server 471, enterprise web server 463, or enterprise FTP server 465.

With reference now to step 650, the remote device receives a configuration file from the remote site indicated by the configuration-URL attribute. In different embodiments, the method of transmission will vary, depending in part upon the nature of location specified by the configuration-URL attribute. With reference to FIG. 4, VPN router 411 receives the configuration file from whatever source was indicated by the configuration-URL attribute sent by IPSec concentrator 461.

With reference to step 660, the configuration file received by the remote device is applied to the remote device. In some embodiments, this process begins by reverting to the checkpointed configuration created during step 635, and then applying a configuration file. In other embodiments, the configuration file is applied to the presently operating configuration on the remote device. In some other embodiments, the step also includes checkpointing the configuration of the remote device after the configuration file has been applied. With reference to FIG. 4, VPN router 411 reverts to the configuration checkpointed in step 635, applies the configuration file received from the remote location, and creates a new checkpoint of the configuration now running on VPN router 411.

Figure 7:
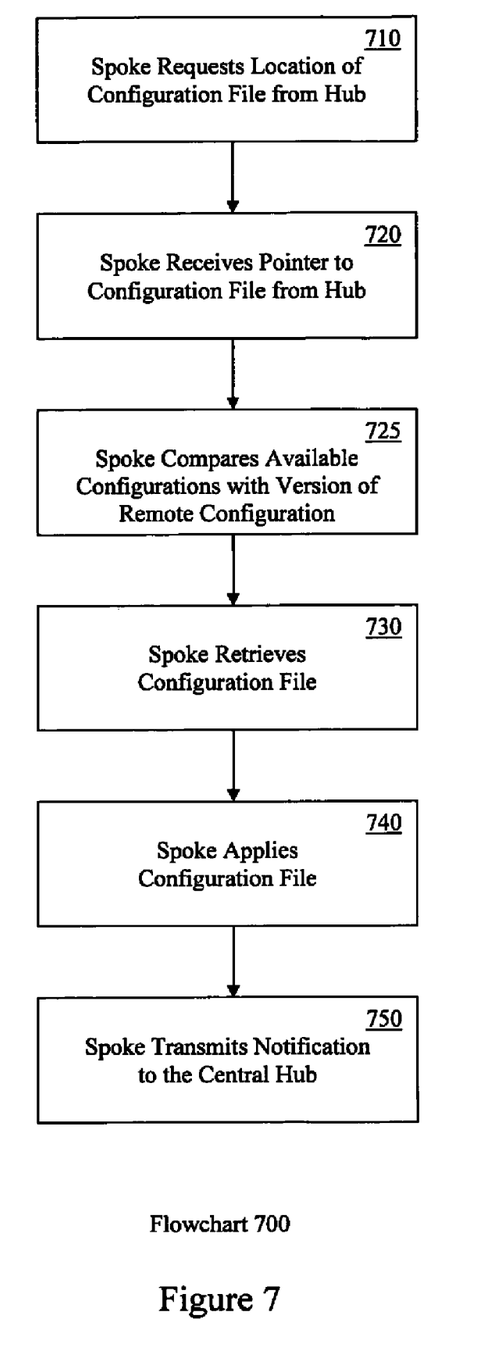
FIG. 7 is a flowchart of a secure method of configuring a remote device from a central server, in accordance with one embodiment of the present invention.

With reference now to FIG. 7, a flowchart 700 of a secure method of configuring a remote device from a remote server is depicted, in accordance with one embodiment of the present invention. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

Flowchart 700 depicts the interaction of a remote device with a remote server, e.g., one of the spokes 310 with the central hub 361 of FIG. 3, from the perspective of the remote device.

With reference to step 701, the spoke device establishes a secure connection to the hub. One consideration in implementing several embodiments of the present invention, is that it can utilize pre-existing techniques for establishing security. The issue is twofold. First, both the remote device and the remote server need to be certain that the other is a trustworthy entity, e.g., that the remote device is authorized to contact to the remote server, and that the remote server is authorized to push new configurations to the remote device. Second, the connection between the spoke and the hub needs to be secure, e.g., the hub and the spoke need to be certain that the information they receive is from the other. By utilizing a preexisting security protocol as part of the configuration mechanism of the present invention, e.g., the IPSec protocol associated with VPN tunnels, both of these concerns are addressed, without introducing any additional need for new hardware, new software protocols, or major alterations to existing systems. With reference to FIG. 5, in some embodiments the VPN module 520 performs the necessary steps to begin establishing an IPSec tunnel to a central server.

With reference to step 710, the spoke device sends a request to the hub for the location of the current configuration file. In some embodiments, the spoke device also requests the version number of the latest configuration file. By placing the configuration file in a separate location from the hub, and by removing the need to transmit configuration commands as part of the negotiation of a secure connection, embodiments of the present invention removed the need to continuously update the hub and every spoke device with new implementations of the protocol for the secure connection. For example, rather than having to continuously upgrade the Mode-Config parser 525 of VPN router 500 to support every new configuration command that could be sent to VPN router 500, Mode-Config parser 525 need only be configured to ask for and understand, the configuration-URL attribute. In embodiments that incorporate the configuration-version attribute as well, Mode-Config parser 525 is configured to handle both attributes.

With reference to step 720, the spoke device receives a pointer to the latest configuration file. In some embodiments, the spoke device receives the version number of the latest configuration file as well. In some embodiments, e.g., a VPN connection between a VPN router such as VPN router 500, and a remote server, the spoke device already receives a number of configuration commands from the hub, as part of establishing the secure connection.

With reference to step 725, in some embodiments where a version number is received, the spoke device compares the version number of the latest configuration file with some or all stored configuration profiles. Should one of the stored configuration profiles match with the version number of the latest configuration file, the spoke device can apply the stored configuration, rather than needing to retrieve a configuration file from a remote location. With reference to FIG. 5, stored configurations may reside in memory module 530, or in some other storage device not pictured.

With reference to step 730, the spoke device retrieves the latest configuration file from the location indicated, if necessary. For different embodiments, different data repository solutions are appropriate here. For example, the hub may indicate a location using a Uniform Resource Locator (URL) which points to an internal secure web server, or any other desirable data storage mechanism. With reference to FIG. 5, VPN router 500 could retrieve the latest configuration file via an external network connection 503, or even from a location accessible via one of the internal network connections 501.

With reference to step 740, the spoke device applies the latest configuration file. In some embodiments, the spoke device first creates a backup of the currently operating configuration, e.g., a checkpoint. Reference to FIG. 5, processor 510, running IOS 515, would apply the commands contained in the latest configuration file, which would alter the present operating state of VPN router 500. Before executing these commands, IOS 515 may call for a snapshot of the present state of VPN router 500 to be stored, e.g., in memory module 503.

With reference to step 750, in some embodiments, the spoke device transmits a notification to the hub, providing the hub with the version number of a configuration currently running on the spoke device. In this way, a monitoring program running on the hub can remain aware of which configuration version is executing on all spoke devices. This notification can be extended as well, in some embodiments, to instruct the spoke devices to transmit additional information regarding their present state, available resources, connected devices, or other desirable information back to the hub. In this way, the hub can be kept informed of the available resources of all spoke devices, utilizing pre-existing secure transmission techniques, and without requiring additional expensive hardware.

What is claimed is:

1. A method of configuring a remote device, said method comprising:
   transmitting a device configuration request from said remote device to a remote server during a Mode-Config exchange between the remote device and the remote server,
   wherein the configuration request expands the Mode-Config exchange and is sent between phase 1 and phase 2 of the Mode-Config exchange during negotiation of a secure connection to the remote server comprising an Internet Key Exchange (IKE) to establish a Virtual Private Network (VPN) Tunnel,
   said configuration request comprising a request for two attributes comprising a location pointer independent of configuration commands and a configuration version identifier, wherein the location pointer points to a latest version of a device configuration file;
   the configuration version identifier identifies the version of the device configuration file to which the location pointer is pointing;
   wherein the configuration request is transparent to other remote server devices that do not recognize the configuration request;
   in response to the device configuration request receiving a response at said remote device, in a Mode-Config reply, said configuration response comprising the location pointer independent of configuration commands wherein the configuration response is received using Mode-Config protocol in the Mode-Config reply;
   retrieving said device configuration file from said location;
   applying said device configuration file to said remote device to configure the remote device; and
   responding to instructions from the remote server during the Mode-Config exchange to transmit additional present state data by sending a status update to the remote server including a version number of a device configuration currently running on a local operating system, resource availability and connected devices.

2. The method of claim 1, wherein said configuration request further comprises a request for a current version identifier related to said device configuration file.

3. The method of claim 2, wherein said configuration response further comprises said current version identifier.

4. The method of claim 3, further comprising:
   comparing said current version identifier with one or more local version identifiers related to one or more local configuration profiles stored on said remote device.

5. The method of claim 4, further comprising:
   if said current version identifier matches one of said local version identifiers, applying said local configuration profile associated with said local version identifier.

6. The method of claim 1, further comprising:
   creating a checkpoint of a current configuration state of said remote device, before applying said device configuration file.

7. A system, comprising:
   a bus, for transmitting information;
   a processor coupled to said bus, for performing operations;
   an operating system running on said processor, for controlling said system;
   an external network connection coupled to said bus, for communicating with a remote server;
   a networking module, for negotiating a secure connection to the remote server during a Mode-Config negotiation, said operating system configured to:
      transmit a configuration request using Mode-Config protocol for a current device configuration file to said remote server to configure a local device, wherein the configuration request expands the Mode-Config negotiation and is sent between phase 1 and phase 2 of a Mode-Config exchange during the Mode-Config negotiation of the secure connection to the remote server comprising an Internet Key Exchange (IKE) to establish a Virtual Private Network (VPN) Tunnel, the configuration request comprising:
         a request for a location pointer independent of configuration commands that points to a latest version of a device configuration file; and
         a request for a configuration version identifier, the configuration version identifier for identifying the version of the device configuration file to which the location pointer is pointing; and
   said external network connection is configured to receive a pointer to said current device configuration file in response to the configuration request using the Mode-Config protocol during the Mode-Config exchange in a Mode-Config reply wherein the location pointer is independent of the configuration commands;
   said operating system is further configured to access a location indicated by said pointer, and respond to instructions from the remote server during the Mode-Config negotiation to transmit additional present state data by sending a status update to the remote server including a version number of a current device configuration, resource availability and connected devices;
   said external network connection is configured to receive said current device configuration file; and
   said processor is configured to perform one or more device configuration operations indicated by said current device configuration file;
   wherein the configuration request is transparent to other remote server devices that do not recognize the configuration request.

8. The system of claim 7, further comprising:
   a memory coupled to said bus, for storing a stored configuration profile, said stored configuration profile having an associated version number, wherein said external network connection receives a version identifier corresponding to said current device configuration file, and said processor compares said version identifier with said version number associated with said stored configuration profile.

9. The system of claim 7, wherein said networking module is configured to establish a secure connection to said remote server.

10. The system of claim 9, wherein said secure connection is in compliance with IPSec networking protocol.

11. The system of claim 7, wherein said request is formatted as a Mode-Config parameter.

12. The system of claim 7, wherein said pointer is formatted as a Mode-Config parameter.

13. A network hub for configuring a spoke device of a hub-spoke network, said network hub comprising:
a receiver for receiving a discrete configuration request from the spoke device during a Mode-Config exchange to negotiate a secure connection between the spoke device and the network hub, the discrete request comprising a request for two attributes comprising a device configuration pointer and a description of a version of a device configuration corresponding to the pointer;
wherein the discrete configuration request expands the Mode-Config exchange and is sent between phase 1 and phase 2 of the Mode-Config exchange during negotiation of the secure connection to the spoke device comprising an Internet Key Exchange (IKE) to establish a Virtual Private Network (VPN) Tunnel;
a transmitter for transmitting the configuration pointer and the description of the version of the configuration from said network hub;
wherein the secure connection is established independent of transmitting configuration commands as part of the negotiation of the secure connection;
wherein the hub is further configured to send a request to the spoke device during the Mode-Config exchange for a status update including a version number of a device configuration currently running on a hub operating system, resource availability or connected devices, or combinations thereof;
wherein the receiver is further configured for receiving a state report from said spoke device;
wherein the state report includes a version number of a configuration currently running on the spoke device; and
wherein the configuration request is transparent to other remote server devices that do not recognize the configuration request.

14. The network hub of claim 13, wherein said secure connection comprises an IPSec Virtual Private Network (VPN) connection between said network hub and said spoke device.

* * * * *